United States Patent
Kim et al.

(10) Patent No.: US 9,935,702 B2
(45) Date of Patent: Apr. 3, 2018

(54) METHOD AND APPARATUS FOR FEEDING BACK CHANNEL STATE INFORMATION FOR 3D MIMO IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 15/013,445

(22) Filed: Feb. 2, 2016

(65) Prior Publication Data

US 2016/0261328 A1    Sep. 8, 2016

Related U.S. Application Data

(60) Provisional application No. 62/128,500, filed on Mar. 4, 2015.

(51) Int. Cl.
| | | |
|---|---|---|
| H04B 7/06 | (2006.01) | |
| H04B 7/0456 | (2017.01) | |
| H04B 7/0417 | (2017.01) | |
| H04L 5/00 | (2006.01) | |
| H04B 7/0452 | (2017.01) | |
| H04B 7/04 | (2017.01) | |

(52) U.S. Cl.
CPC ......... *H04B 7/0632* (2013.01); *H04B 7/0417* (2013.01); *H04B 7/0456* (2013.01); *H04B 7/063* (2013.01); *H04B 7/0626* (2013.01); *H04B 7/0689* (2013.01); *H04L 5/006* (2013.01); *H04L 5/0048* (2013.01); *H04B 7/0452* (2013.01); *H04B 7/0486* (2013.01)

(58) Field of Classification Search
CPC .. H04B 7/0632; H04B 7/0417; H04B 7/0456; H04B 7/0626; H04B 7/063; H04B 7/0689; H04B 7/0452; H04B 7/0486; H04L 5/006; H04L 5/0048
See application file for complete search history.

(56) References Cited

U.S. PATENT DOCUMENTS

| | | | | |
|---|---|---|---|---|
| 2013/0250879 | A1* | 9/2013 | Ng | H04W 72/042 370/329 |
| 2014/0105162 | A1* | 4/2014 | Li | H04W 72/042 370/329 |
| 2014/0133395 | A1* | 5/2014 | Nam | H04B 7/0452 370/328 |

* cited by examiner

*Primary Examiner* — Habte Mered
(74) *Attorney, Agent, or Firm* — Birch, Stewart, Kolasch & Birch, LLP

(57) ABSTRACT

A method of reporting channel state information to a base station at a user equipment (UE) in a wireless communication system is disclosed. The method includes configuring a two-dimensional (2D) antenna array transmission mode of a downlink data channel via a higher layer, receiving an indicator corresponding to one of transmission schemes of the downlink data channel via the higher layer, calculating the channel state information on the assumption of one transmission scheme of the downlink data channel corresponding to the indicator, and reporting the calculated channel state information to the base station. The transmission schemes of the downlink data channel include a demodulation-reference signal (DM-RS) based large delay (LD) cyclic delay diversity (CDD) transmission scheme and a closed loop multiplexing transmission scheme in the 2D antenna array transmission mode.

4 Claims, 8 Drawing Sheets

FIG. 2
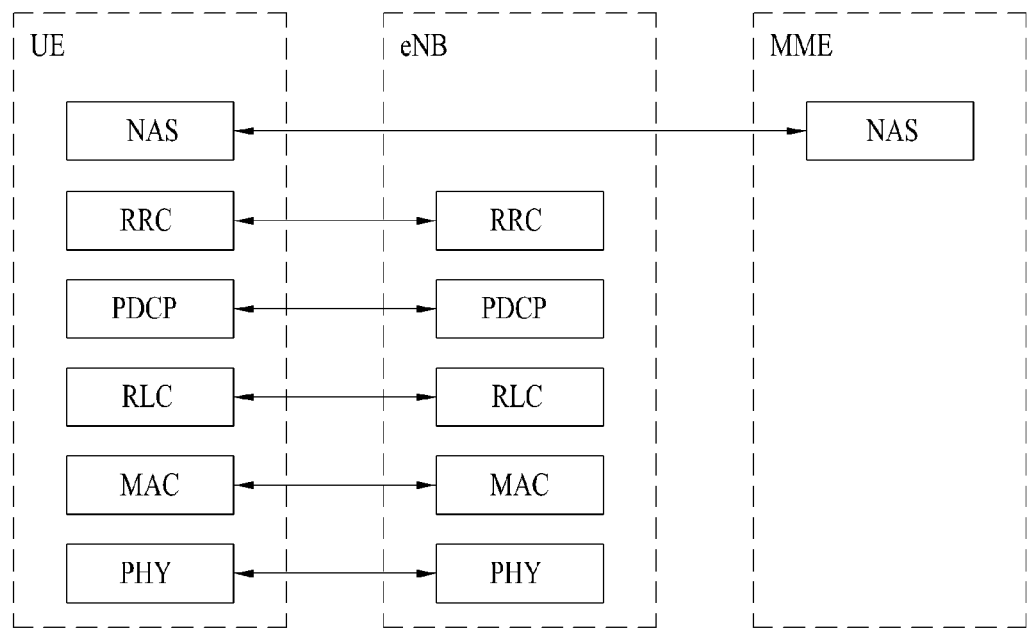
(A) CONTROL-PLANE PROTOCOL STACK
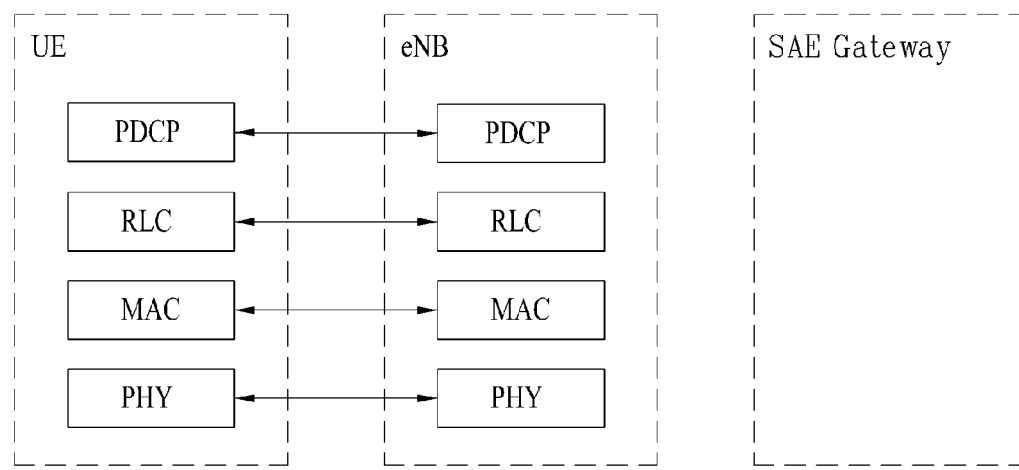
(B) USER-PLANE PROTOCOL STACK Block A Block B

METHOD AND APPARATUS FOR FEEDING BACK CHANNEL STATE INFORMATION FOR 3D MIMO IN WIRELESS COMMUNICATION SYSTEM

This application claims the benefit of U.S. Provisional Application No. 62/128,500, filed on Mar. 4, 2015, which is hereby incorporated by reference as if fully set forth herein.

BACKGROUND OF THE INVENTION

Field of the Invention

The present invention relates to a wireless communication system and, more particularly, to a method and apparatus for feeding back channel quality information in order to apply a large delay (LD)-cyclic delay diversity (CDD) scheme corresponding to three-dimensional (3D) multiple input multiple output (MIMO) in a wireless communication system.

Discussion of the Related Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Accordingly, the present invention is directed a method and apparatus for feeding back channel state information for 3D MIMO in a wireless communication system that substantially obviates one or more problems due to limitations and disadvantages of the related art.

An object of the present invention is to provide a method and apparatus for feeding back channel state information for 3D MIMO in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reporting channel state information to a base station at a user equipment (UE) in a wireless communication system includes configuring a two-dimensional (2D) antenna array transmission mode of a downlink data channel via a higher layer, receiving an indicator corresponding to one of transmission schemes of the downlink data channel via the higher layer, calculating the channel state information on the assumption of one transmission scheme of the downlink data channel corresponding to the indicator, and reporting the calculated channel state information to the base station, wherein the transmission schemes of the downlink data channel include a demodulation-reference signal (DM-RS) based large delay (LD) cyclic delay diversity (CDD) transmission scheme and a closed loop multiplexing transmission scheme in the 2D antenna array transmission mode.

In another aspect of the present invention, a user equipment (UE) in a wireless communication system includes a wireless communication module configured to transmit and receive a signal to and from a base station and a processor configured to process the signal. The processor controls the wireless communication module to configure a two-dimensional (2D) antenna array transmission mode of a downlink data channel via a higher layer, to receive an indicator corresponding to one of transmission schemes of the downlink data channel via the higher layer, to calculate the channel state information on the assumption of one transmission scheme of the downlink data channel corresponding to the indicator and to report the calculated channel state information to the base station, and the transmission schemes of the downlink data channel include a demodulation-reference signal (DM-RS) based large delay (LD) cyclic delay diversity (CDD) transmission scheme and a closed loop multiplexing transmission scheme in the 2D antenna array transmission mode.

In the above-described embodiments, the indicator may indicate whether a precoding matrix index is reported. In this case, if the indicator indicates that the precoding matrix index is not reported, the transmission scheme of the downlink data channel corresponding to the indicator may be the DM-RS based LD CDD transmission scheme and a rank indicator included in the channel state information may be fixed to 1 or a predetermined value.

Alternatively, the indicator may indicate whether a rank indicator is reported. If the indicator indicates that the rank indicator is reported, the transmission scheme of the downlink data channel corresponding to the indicator may be the DM-RS based LD CDD transmission scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a UE and an E-UTRAN based on the 3GPP radio access network specification.

DETAILED DESCRIPTION OF THE INVENTION

Figure 1:
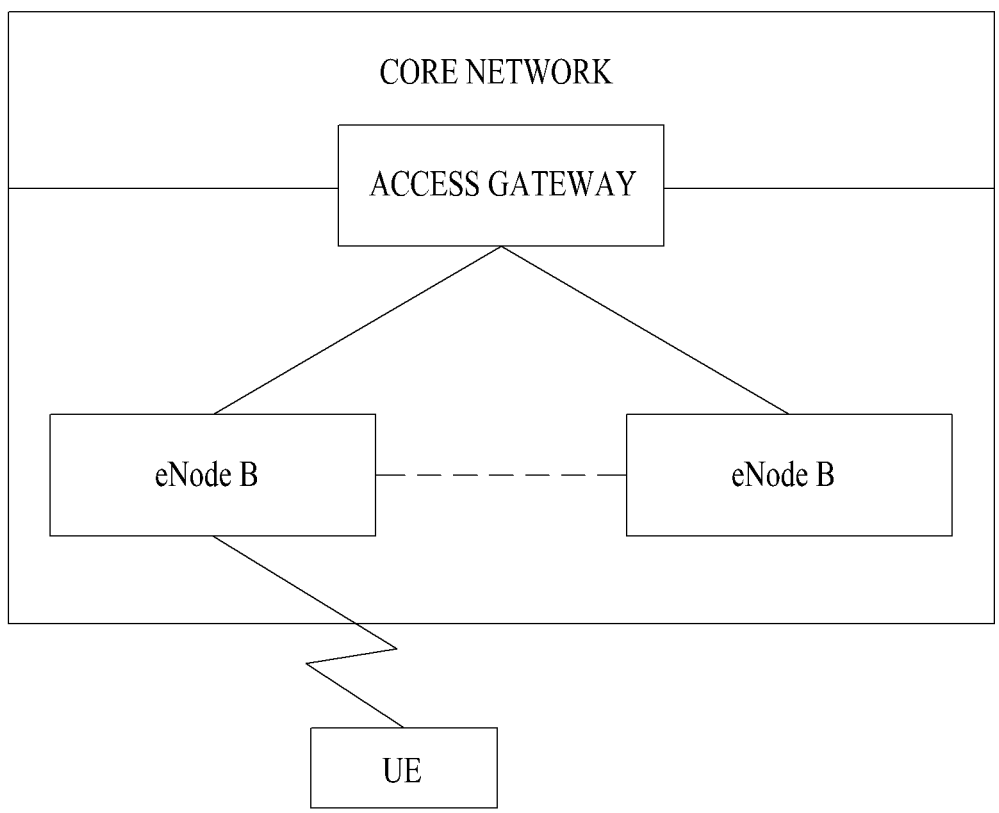
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2, including view (A) and view (B), is a diagram illustrating structures of a control plane and a user plane of a radio interface protocol between a UE and an E-UTRAN based on 3GPP radio access network specifications. As shown in (A) of FIG. 2, the control plane refers to a path used for transmission of control messages, which is used by the UE and the network to manage a call. As shown in (B) of FIG. 2, the user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
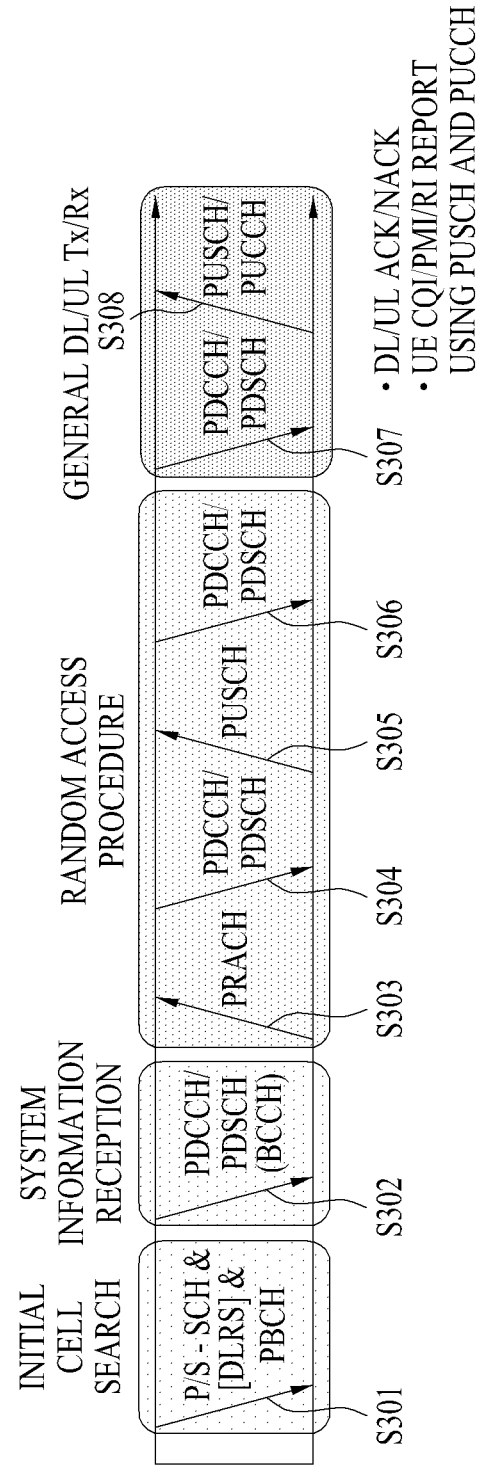
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
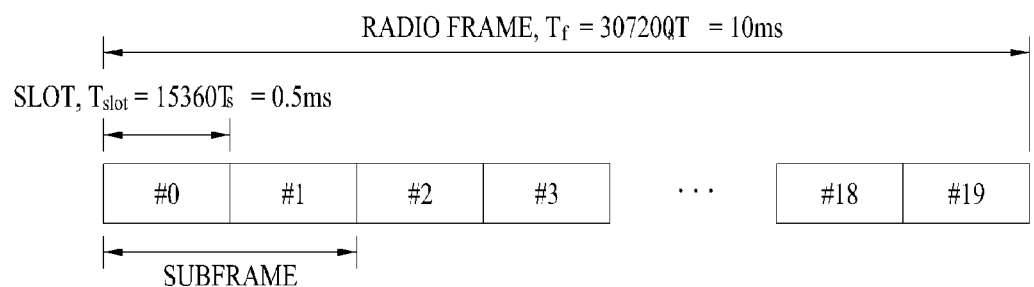
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
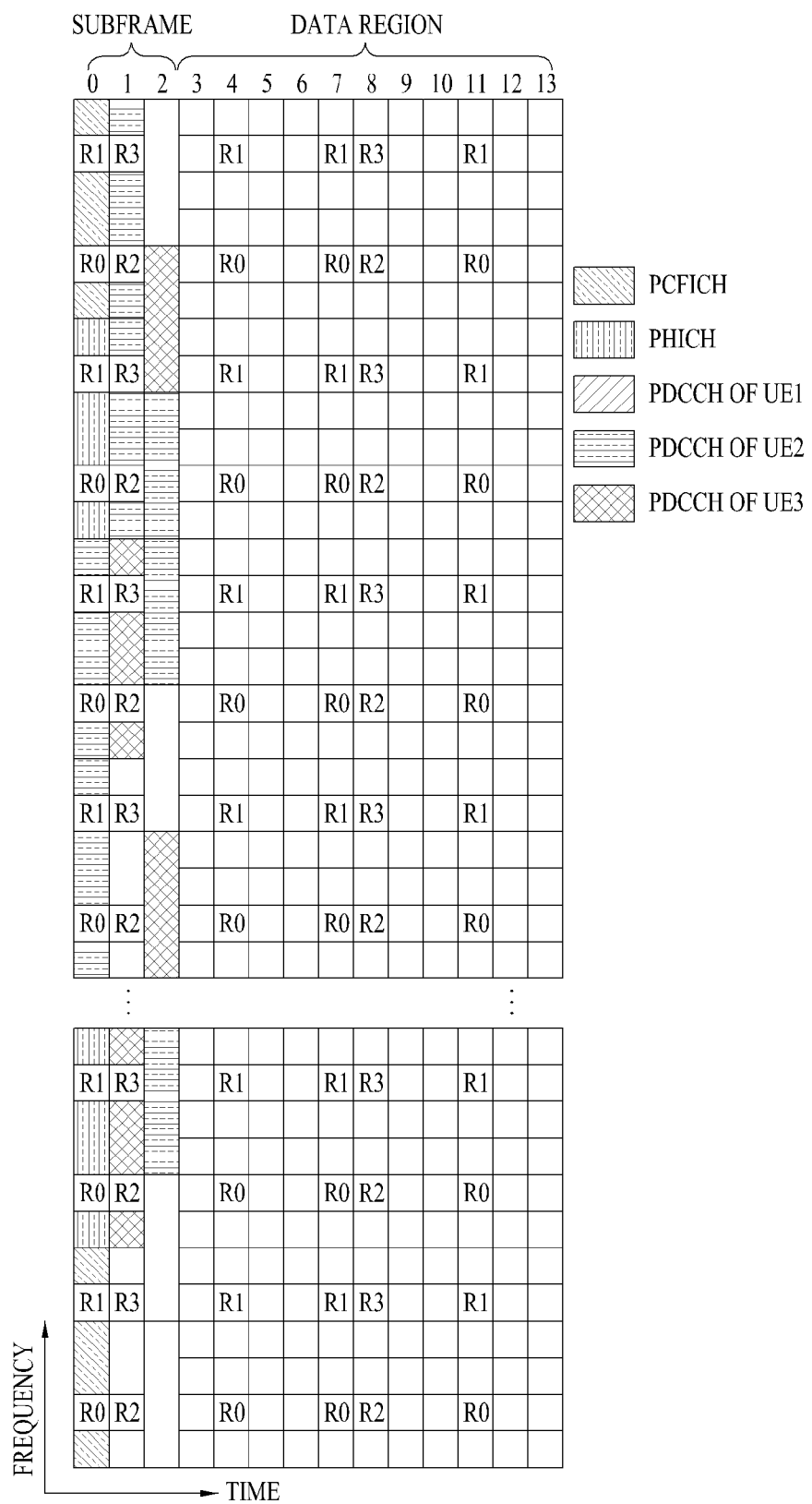
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
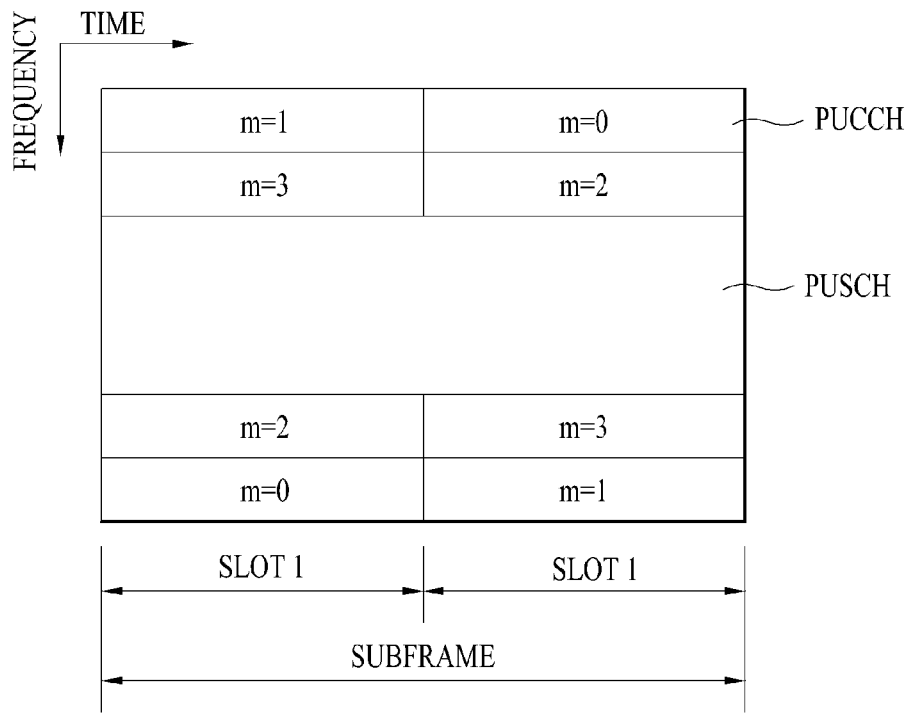
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
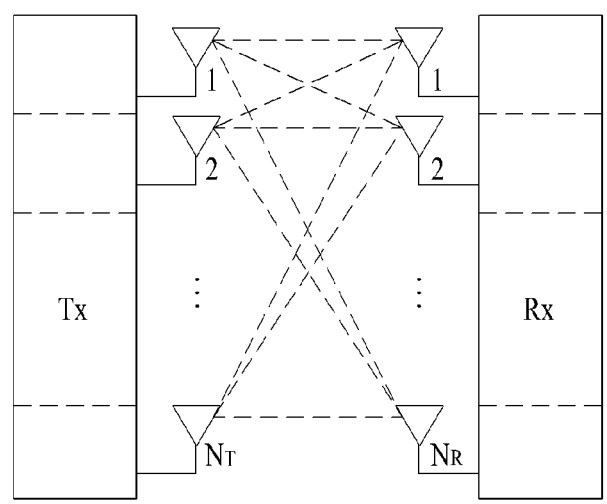
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}] \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector S may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector S by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_1 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

A DM-RS which is a dedicated reference signal is supported for PDSCH transmission and is transmitted on antenna port(s) p=5, p=7, p=8 or p=7, 8, . . . , v+6 (where, v is the number of layers used for PDSCH transmission). The DM-RS exists when PDSCH transmission is associated with the antenna port and is a valid reference only for PDSCH demodulation. The DM-RS is transmitted only on RBs to which the PDSCHs are mapped.

That is, the DM-RS is configured to be transmitted only on RBs, to which the PDSCHs are mapped, in a subframe in which the PDSCHs are scheduled, unlike a CRS configured to be transmitted in every subframe regardless of presence/absence of the PDSCH. In addition, the DM-RS is transmitted only via antenna port(s) corresponding to layer(s) of the PDSCHs, unlike the CRS transmitted via all antenna port(s) regardless of the number of layers of the PDSCHs. Accordingly, overhead of the RS may be reduced as compared to the CRS.

Hereinafter, channel state information (CSI) report will be described. In the current LTE standard, two transmission schemes, i.e., an open-loop MIMO scheme operating without channel information and a closed-loop MIMO scheme based on channel information exist. In particular, in the closed-loop MIMO scheme, in order to obtain multiplexing gain of a MIMO antenna, an eNB and a UE may perform beamforming based on channel state information. The eNB transmits a reference signal to the UE and instructs the UE to feed back the channel state information measured based thereon via a physical uplink control channel (PUCCH) or a physical uplink shared channel (PUSCH), in order to obtain the channel state information from the UE.

The CSI is roughly divided into a rank indicator (RI), a precoding matrix index (PMI) and a channel quality indicator (CQI). First, the RI indicates the rank information of a channel as described above and means the number of streams which may be received by the UE via the same time-frequency resources. In addition, the RI is determined by long term fading of the channel and thus is fed back to the eNB at a period longer than that of the PMI or CQI. Second, the PMI has a channel space property and indicates a precoding index of the eNB preferred by the UE based on a metric such a signal to interference plus noise ratio (SINR). Lastly, the CQI indicates the intensity of the channel and means a reception SINR obtained when the eNB uses the PMI.

Based on measurement of the radio channel, the UE calculates a preferred PMI and RI which may derive an optimal or best transfer rate when the PMI and RI are used by the BS in the current channel state and feeds the calculated PMI and RI back to the BS. Here, the CQI refers to a modulation and coding scheme for providing an acceptable packet error probability for the fed-back PMI/RI.

In an LTE-A system including more precise MU-MIMO and explicit CoMP operations, current CSI feedback was defined in LTE and thus does not sufficiently support newly introduced operations. As it gradually becomes difficult to obtain MU-MIMO or CoMP throughput gain with sufficient requirements for CSI feedback accuracy, a PMI was decided to be composed of two PMIs, that is, a long-term/wideband PMI W and a short-term/subband PMI W2. In other words, a final PMI is expressed by a function of W1 and W2. For example, the final PMI W may be defined as follows: W=W1*W2 or W=W2*W1. Accordingly, in LTE-A, the CSI may be composed of an RI, W1, W2 and a CQI.

In a 3GPP LTE(-A) system, an uplink channel used for CSI transmission is shown in Table 1 below.

TABLE 1

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 1, the CSI may be transmitted using a physical uplink control channel (PUCCH) at a higher layer at a predetermined period or may be aperiodically transmitted via a physical uplink shared channel (PUSCH) according to a demand of a scheduler. The CSI may be transmitted using the PUSCH, only when a frequency-selective method or an aperiodic CSI transmission method is used. Hereinafter, a scheduling method and a CSI transmission method according to periodicity will be described.

1) CQI/PMI/RI Transmission Via PUSCH after Reception of CSI Transmission Request Control Signal (CSI Request)

A control signal for requesting transmission of a CSI may be included in a PUSCH scheduling control signal (UL grant) transmitted via a PDCCH signal. Table 2 below shows the mode of a UE when the CQI, PMI and RI are transmitted via the PUSCH.

TABLE 2

|  |  | PMI Feedback Type | | |
|---|---|---|---|---|
|  |  | No PMI | Single PMI | Multiple PMIs |
| PUSCH CQI Feedback Type | Wideband (Wideband CQI) |  |  | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband WI) |
|  | UE selected (Subband CQI) | Mode 2-0 RI (only for Open-loop SM) 1st wideband CQI(4 bit) + Best-M CQI(2 bit) (Best-M CQI: average CQI for selected M SB(s) among N SBs Best-M index (L bit) |  | Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband WI) |
|  | Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission mode of Table 2 is selected at a higher layer and the CQI/PMI/RI is transmitted in the same PUSCH subframe. Hereinafter, an uplink transmission method of a UE in each mode will be described.

Mode 1-2 refers to the case in which a precoding matrix is selected on the assumption that data is transmitted only via a subband. The UE generates a CQI on the assumption of a precoding matrix selected with respect to a bandwidth (set S) designated at a higher layer or a system bandwidth. In Mode 1-2, the UE may transmit a CQI and a PMI value of each subband. At this time, the size of each subband may be changed according to the size of the system bandwidth.

A UE in Mode 2-0 may select preferred M subbands with respect to the bandwidth (set S) designated at the higher layer or the system bandwidth. The UE may generate one CQI value on the assumption that data is transmitted with respect to the selected M subbands. The UE may further report one CQI (wideband CQI) value with respect to the set S or the system bandwidth. The UE defines a CQI value for each codeword in the differential form when a plurality of codewords exists with respect to the selected M subbands.

At this time, the differential CQI value is set to a difference between an index corresponding to the CQI value for the selected M subbands and a wideband CQI (WB-CQI) index.

A UE in Mode 2-0 may transmit information on the locations of the selected M subbands, one CQI value for the selected M subbands and the CQI value generated with respect to the whole bandwidth or the designated bandwidth (set S) to the BS. At this time, the size of the subband and the M value may be changed according to the size of the system bandwidth.

A UE in Mode 2-2 may simultaneously select a single precoding matrix for the M preferred subbands and the locations of the M preferred subbands, on the assumption that data is transmitted via the M preferred subbands. At this time, the CQI value for the M preferred subbands is defined per codeword. In addition, the UE further generates a wideband CQI value with respect to the designated bandwidth (set S) or the system bandwidth.

A UE in Mode 2-2 may transmit information on the locations of the selected M subbands, one CQI value for the selected M subbands, a single PMI for the M preferred subbands, a wideband PMI and a wideband CQI value to the BS. At this time, the size of the subband and the M value may be changed according to the size of the system bandwidth.

A UE in Mode 3-0 generates a wideband CQI value. The UE generates a CQI value for each subband on the assumption that data is transmitted via each subband. At this time, even in the case of RI>1, the CQI value indicates only the CQI value for a first codeword.

A UE in Mode 3-1 generates a single precoding matrix with respect to the system bandwidth or the designated bandwidth (set S). The UE assumes the generated single precoding matrix with respect to each subband and generates a subband CQI per codeword. In addition, the UE may assume a single precoding matrix and generate a wide CQI. The CQI value of each subband may be expressed in a differential form. The subband CQI value is calculated by a difference between a subband CQI index and a wideband CQI index. At this time, the size of the subband may be changed according to the size of the system bandwidth.

A UE in Mode 3-2 generates a precoding matrix for each subband instead of the single precoding matrix for the whole bandwidth, as compared to Mode 3-1.

2) Periodic CQI/PMI/RI Transmission Via PUCCH

The UE may periodically transmit a CSI (e.g., CQI/PMI/RI information) to the BS via the PUCCH. If the UE receives a control signal for transmission of user data, the UE may transmit a CQI via the PUCCH. Even when the control signal is transmitted via the PUSCH, the CQI/PMI/RI may be transmitted using one of the modes defined in Table 3 below.

TABLE 3

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selection (subband CQI) | Mode 2-0 | Mode 2-1 |

The UE may have the transmission mode shown in Table 3. Referring to Table 3, in the case of Mode 2-0 and Mode 2-1, a bandwidth part (BP) is a set of subbands consecutively located in a frequency domain and may cover the system bandwidth or the designated bandwidth (set S). In Table 6, the size of each subband, the size of the BP and the number of BPs may be changed according to the size of the system bandwidth. In addition, the UE transmits the CQI per BP in the frequency domain in ascending order so as to cover the system bandwidth or the designated bandwidth (set S).

According to the transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

When the UE transmits the RI and the wideband CQI/PMI, the CQI/PMI is transmitted in subframes with different periods and offsets. In addition, if the RI and the wideband CQI/PMI should be transmitted in the same subframe, the CQI/PMI is not transmitted.

In Table 3, the transmission period of the wideband CQI/PMI and the subband CQI is P and has the following properties.

The wideband CQI/PMI has a period of H*P. At this time, H=J*K+1, J is the number of BPs and K is the number of periods of the BP. That is, the UE performs transmission at {0, H, 2H, . . . }.

The CQI is transmitted at timing J*K other than timing when the wideband CQI/PMI is transmitted.

In Table 3, the transmission period of the RI is a M multiple of the wideband CQI/PMI period and has the following properties.

The offset of the RI and the wideband CQI/PMI is O and, when the RI and the wideband CQI/PMI are transmitted in the same subframe, the wideband CQI/PMI is not transmitted.

The parameters P, H, K and O shown in Table 3 are all determined at the higher layer of the UE and signaled to the physical layer of the UE.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
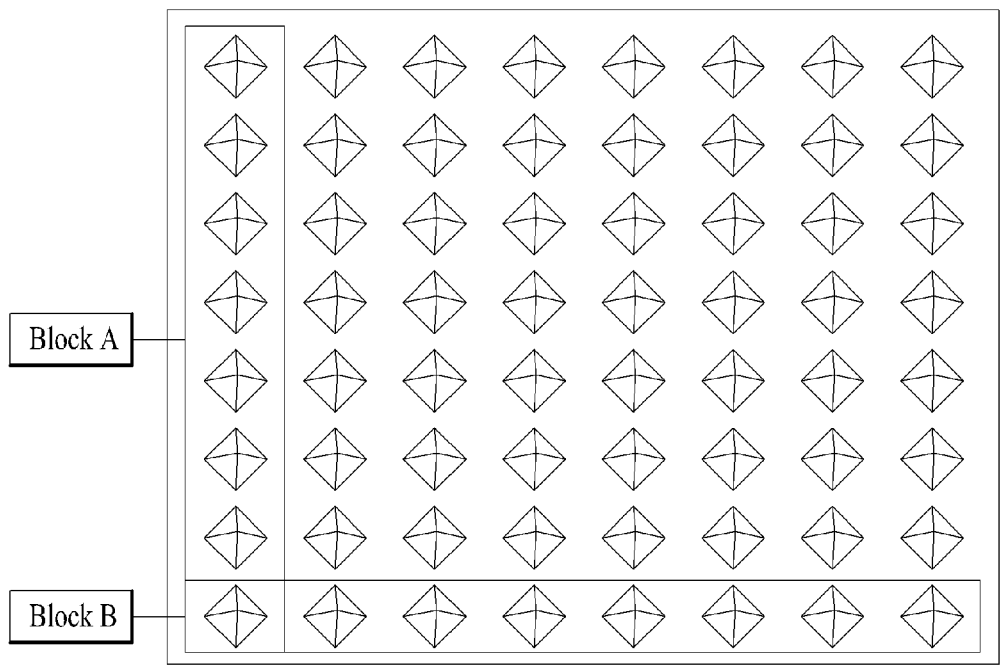
FIG. 8 illustrates an example of implementation of the 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is established by mounting a large number of antennas in vertical and horizontal directions.

The present invention relates to a CSI feedback method when a large delay-cyclic delay diversity (LD-CDD) transmission scheme is used based on a DM-RS. In the 2D AAS, as the number of transmit antennas in the eNB increases, a DM-RS based LD-CDD transmission scheme may be introduced, such that the LD-CDD scheme also supports rank 5 or higher. In this case, the present invention proposes a CSI feedback method upon applying the DM-RS based LD-CDD transmission scheme and a PRB bundling scheme of a UE upon applying the DM-RS based LD-CDD transmission scheme.

Prior to the description of the present invention, the LD-CDD scheme of the current LTE system will be described. Currently, in the LTE system, the LD-CDD scheme is defined as shown in Equation 8 below.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix}$$ [Equation 8]

In Equation 8, $x(i)=[x^{(0)}(i) \ldots x^{(v-1)}(i)]^T$ denotes a data symbol vector, to which precoding is not applied, and $y(i)=[y^{(0)}(i) \ldots y^{(P-1)}(i)]^T$ denotes a transmitted signal vector, to which precoding is applied. In addition, v and P denote the number of transmission layers and the number of antenna ports, respectively. In addition, in Equation 8, W(i) means a precoding matrix for adjusting a channel. Accordingly, an appropriate codeword may be selected and used from a codebook according to channel change.

However, currently, in the LD-CDD scheme of the LTE system, the codeword is not selected for use according to channel state. W(i) used in the LTE system is shown in Equation 9 below.

$$\begin{cases} W(i) = C_l & \text{for 2 antenna ports} \\ W(i) = C_k, k = \left(\left\lfloor \dfrac{i}{v} \right\rfloor \bmod 4\right) + 1 \in \{1, 2, 3, 4\} & \text{for 4 antenna ports} \end{cases}$$

[Equation 9]

In Equation 9, $C_k$ denotes a codeword. With a fixed value or a value having a constant pattern, W(i) corresponds to the changed channel.

In contrast, in Equation 8, D(i) and U serve to mix all transmission layers in a domain to distribute signals of a layer domain in all virtual antennas with the same ratio. Thus, all layers have the same channel quality. Averaging the layers serves to reduce signal overhead. For example, when a linear minimum mean square error (MMSE) scheme is used in a receiver, only one CQI may be fed back and individual HARQ retransmission is not required for different layers, thereby reducing downlink control signaling. Currently, D(i) and U used in the LTE system are defined as shown in Table 4 below.

TABLE 4

| Number of layers υ | U | D(i) |
|---|---|---|
| 2 | $\dfrac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\dfrac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\dfrac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Figure 10:
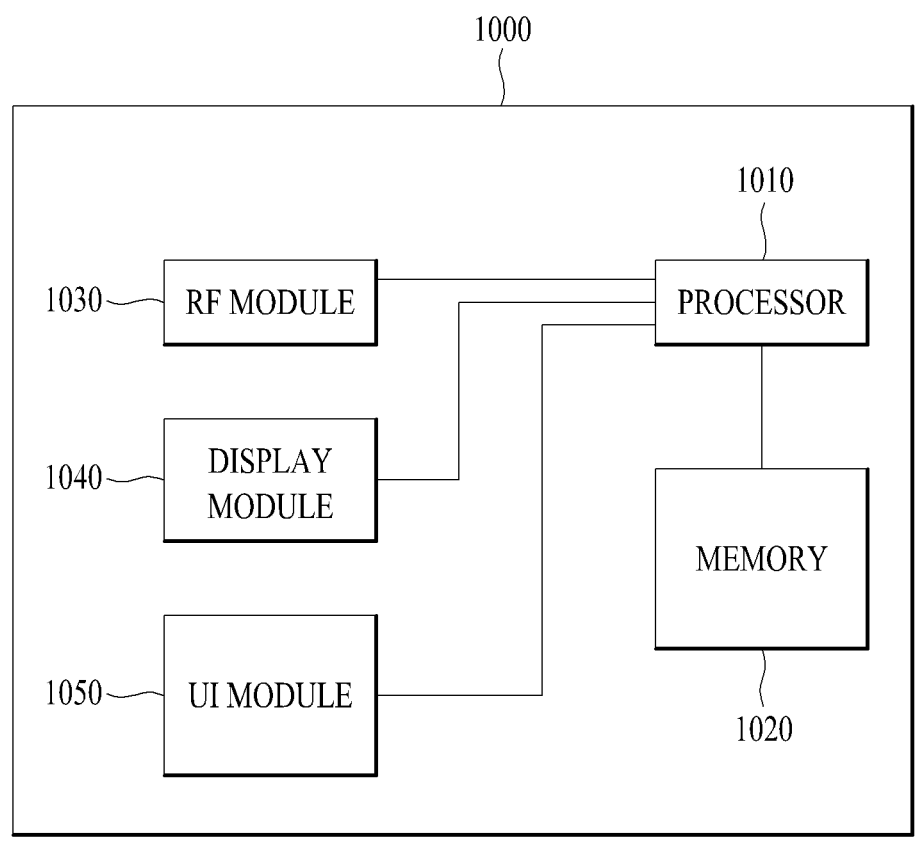
FIG. 10 is a block diagram of a communication apparatus according to an embodiment of the present invention.

Generalization of the LD-CDD system will now be described. In Equation 8, W(i) is defined as a precoder related to a channel, U is generalized to a unitary matrix, and D(i) is generalized to a diagonal matrix in which diagonal terms have the same magnitude and a phase difference as shown in FIG. 10 below.

$$D(i) = \begin{bmatrix} 1 & 0 & L & 0 \\ 0 & e^{j\theta_{1,i}} & L & 0 \\ M & M & O & 0 \\ 0 & 0 & 0 & e^{j\theta_{v-1,i}} \end{bmatrix}$$

[Equation 10]

Referring to Equation 10, D(i) performs phase shift according to frequency. When the generalized W(i), D(i) and U are inserted into Equation 8, all layers are subjected to beamforming changed according to frequency by D(i) and U. More specifically, a covariance matrix of a transmission vector Y is calculated as shown in Equation 11 below.

$$R_{yy}^{(i)} = E[Y(i)(y(i))^H] = W(i)D(i)UU^H(D(i))^H(W(i))^H = W(i)(W(i))^H$$

[Equation 11]

If it is assumed that W(i) is used for a precoder for increasing channel gain by maximally using a high eigenvalue of the channel, in Equation 11, D(i) and U concentrate on averaging the channel quality of all layers while preserving such channel gain, because D(i) and U do not change the covariance matrix of the transmission vector.

As described above, when 2D-AAS is established in an eNB, vertical antennas are also installed. When an existing LD-CDD method obtains diversity gain while exchanging the horizontal beams, the 2D-AAS eNB preferably changes the vertical beams in order to obtain large diversity gain. Accordingly, recently, an LD-CDD method for changing the vertical beams was proposed.

However, the LD-CDD method for changing the vertical beams has one problem. Fundamentally, in the LD-CDD method of the current LTE system, the eNB and the UE know the precoder shown in Equation 8 in advance. In addition, the eNB notifies the UE of channels from horizontal antenna ports to the UE via the CRS for the horizontal antenna port and the UE applies the precoder to the channel found using the CRS to find a final channel. Here, when the eNB, which has installed the 2D-AAS, changes and uses the precoder for the vertical beams, CRS ports corresponding in number to the total number of antenna ports of the eNB are necessary. However, currently, since the CRS is defined by four antenna ports, a DM-RS based LD-CDD scheme was proposed. Currently, according to the LTE standard, using the DM-RS, LD-CDD transmission through up to eight layers may be possible.

More specifically, the DM-RS based LD-CDD scheme may be configured as shown in Equations 12 and 13 below.

$$\begin{bmatrix} y^{(0)}(i) \\ \vdots \\ y^{(P-1)}(i) \end{bmatrix} = W(i_{RB}) \begin{bmatrix} r^{(0)}(i) \\ \vdots \\ r^{(v-1)}(i) \end{bmatrix}$$

[Equation 12]

$$\begin{bmatrix} y^{(0)}(i) \\ \vdots \\ y^{(P-1)}(i) \end{bmatrix} = W(i_{RB})D(i)U \begin{bmatrix} x^{(0)}(i) \\ \vdots \\ x^{(v-1)}(i) \end{bmatrix}$$

[Equation 13]

First, as shown in Equation 12, D(i) is not applied to $r(i)=[r^{(0)}(i) \ldots r^{(v-1)}(i)]^T$ which is a DM-RS sequence vector and $W(i_{RB})$ is applied to each RB or bundled RBs. Here, $W(i_{RB})$ may be changed to a fixed value or a constant pattern according to RB or bundled RBs. In contrast, in a data symbol for a PDSCH, as shown in Equation 13, $W(i_{RB})$, D(i) and U are all applied.

Currently, according to the 3GPP LTE standard, upon calculating the CSI, the UE determines a CSI calculation method by a combination of a feedback mode per CSI process signaled via a higher layer, that is, an RRC layer, and a transmission mode TM. In LTE-A, when a TM (hereinafter, referred to as TM x) for 3D MIMO (or full duplex (FD) MIMO) is newly defined, the UE calculates the CSI on the assumption of 3D MIMO by combining a feedback type and TM x. At this time, 3D MIMO transmission may be subdivided into two TMs. That is, 3D MIMO transmission may be divided into closed loop (CL) transmission for obtaining multiplexing gain via PMI feedback and DM-RS based open loop (OL) LD-CDD transmission for obtaining diversity gain and multiplexing gain without PMI feedback.

In this case, even in TM x, the UE performs CSI feedback which varies according to CL transmission or DM-RS based OL LD-CDD transmission. Although LD-CDD transmission and CL transmission belong to the same TM in the related art, if LD-CDD transmission and CL transmission do not belong to the same TM in 3D MIMO, new RRC signaling for distinguishing between LD-CDD transmission and CL transmission is necessary and the UE changes a transmission scheme assumed upon calculating the CSI according to signaling. To this end, separately from enable signaling for existing PMI/RI reporting, addition of enable signaling for PMI reporting is proposed.

For example, the existing PMI/RI reporting signaling having a size of 1 bit may be extended to define signaling having a size of 2 bits and 00, 01, 10 and 11 may be respectively defined as PMI/RI reporting ON, PMI/RI reporting OFF, PMI reporting OFF and PMI reporting ON. In PMI reporting OFF, the UE feeds back only the CQI and RI and, in the PMI reporting ON, the UE feeds back only the CQI and the PMI on the assumption that the RI is a specific value. That is, in the PMI reporting ON mode, the RI is always assumed to be 1 or a value agreed upon by the UE and the eNB via RRC signaling or higher layer signaling. Alternatively, 11 of the signaling values having a size of 2 bits may be reserved for other uses. Alternatively, PMI reporting ON operates similarly to existing PMI/RI reporting ON. That is, in PMI reporting ON, the UE calculates and feeds back the RI, CQI and the PMI.

In TM x, in the case of PMI reporting OFF, the UE assumes DM-RS based LD-CDD transmission and calculates the CSI. That is, in CSI reference resource, the CSI is calculated on the assumption of the PDSCH transmission scheme according to Table 5 below.

TABLE 5

| Transmission mode | Transmission scheme of PDSCH |
| --- | --- |
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity If the UE is configured with PMI/RI reporting: if the number of CSI-RS ports is one, single-antenna port, port 7; otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7; otherwise transmit diversity |

TABLE 5-continued

| Transmission mode | Transmission scheme of PDSCH |
| --- | --- |
| | If a CSI process of the UE is configured with PMI/RI reporting: if the number of CSI-RS ports is one, single-antenna port, port 7; otherwise up to 8 layer transmission, ports 7-14 (see subclause 7.1.5B) |
| x | If a CSI process of the UE is configured without PMI/RI reporting: if the number of CSI-RS ports is one, single-antenna port, port7; otherwise transmit diversity If a CSI process of the UE is configured with PMI/RI reporting: if the number of CSI-RS ports is one, single-antenna port, port 7; otherwise up to 8 layer transmission, ports 7-14 (see subclause 7.1.5B) If a CSI process of the UE is configured without PMI reporting: if the number of CSI-RS ports is one, single-antenna port, port7; otherwise DM-RS based large delay CDD |

In addition, in TM x, in the case of PMI reporting OFF (that is, without PMI reporting), the periodic CSI reporting mode is restricted to mode 1-0 and mode 2-0 as shown in Table 6 below.

TABLE 6

Transmission mode 1: Modes 1-0, 2-0
Transmission mode 2: Modes 1-0, 2-0
Transmission mode 3: Modes 1-0, 2-0
Transmission mode 4: Modes 1-1, 2-1
Transmission mode 5: Modes 1-1, 2-1
Transmission mode 6: Modes 1-1, 2-1
Transmission mode 7: Modes 1-0, 2-0
Transmission mode 8: Modes 1-1, 2-1 if the UE is configured with PMI/RI reporting; modes 1-0, 2-0 if the UE is configured without PMI/RI reporting
Transmission mode 9: Modes 1-1, 2-1 if the UE is configured with PMI/RI reporting and number of CSI-RS ports > 1; modes 1-0, 2-0 if the UE is configured without PMI/RI reporting or number of CSI-RS ports = 1.
Transmission mode 10: Modes 1-1, 2-1 if the UE is configured with PMI/RI reporting and number of CSI-RS ports > 1; modes 1-0, 2-0 if the UE is configured without PMI/RI reporting or number of CSI-RS ports = 1.
Transmission mode x: Modes 1-1, 2-1 if the UE is configured with PMI/RI reporting and number of CSI-RS ports > 1; modes 1-0, 2-0 if the UE is configured without PMI/RI reporting or without PMI reporting or number of CSI-RS ports = 1.

In addition, according to the current standard, in Mode 1-0 and Mode 2-0, the RI is fed back only in TM3. In TM x, even in the case of PMI reporting OFF, correction is required as shown in Table 7 below such that the RI is fed back.

TABLE 7

Mode 1-0 description:
   In the subframe where RI is reported (only for transmission mode 3 and for transmission mode x without PMI reporting):
      A UE shall determine a RI assuming transmission on set S subbands.
      The UE shall report a type 3 report consisting of one RI.
   In the subframe where CQI is reported:
      A UE shall report a type 4 report consisting of one wideband CQI value which is TABLE 7-continued calculated assuming transmission on set S subbands. The wideband
  CQI represents channel quality for the first codeword, even
  when RI > 1.
  For transmission mode 3 or transmission mode
  x without PMI reporting, the CQI is
  calculated conditioned on the last reported periodic RI. For other
  cases, it is calculated conditioned on transmission rank 1.
Mode 2-0 description:
  In the subframe where RI is reported (only for transmission mode 3
  and for transmission mode x without PMI reporting):
    A UE shall determine a RI assuming transmission on set S subbands.
    The UE shall report a type 3 report consisting of one RI.
  In the subframe where wideband CQI is reported:
    The UE shall report a type 4 report on each respective successive
      reporting opportunity consisting of one wideband CQI
      value which is calculated assuming
      transmission on set S subbands. The wideband
      CQI represents channel quality for
      the first codeword, even when RI > 1.
    For transmission mode 3 or transmission mode x
    without PMI reporting, the CQI is
    calculated conditioned on the last reported periodic RI. For other
    cases, it is calculated conditioned on transmission rank 1.
  In the subframe where CQI for the selected subbands is reported:
    The UE shall select the preferred subband within
    the set of $N_j$ subbands in each of
    the J bandwidth parts where J is given in Table 7.2.2-2.
    The UE shall report a type 1 report consisting of one CQI value
    reflecting transmission only over the selected subband of a
    bandwidth part determined in the
    previous step along with the corresponding preferred
    subband L-bit label. A type 1
    report for each bandwidth part will in turn be
    reported in respective successive
    reporting opportunities. The CQI represents
    channel quality for the first codeword,
    even when RI > 1.
    For transmission mode 3 or transmission mode
    x without PMI reporting, the
    preferred subband selection and CQI values
    are calculated conditioned on the last
    reported periodic RI. For other cases they are calculated conditioned
    on transmission rank 1.

In DM-RS based LD-CDD, PRB bundling may be used in order to improve channel estimation performance of the UE. In Equations 12 and 13, unlike data, LD-CDD is not applied to the DM-RS RE in units of one PRB pair or bundled PRBs and the same precoder is used, in order to improve channel estimation performance using the DM-RS. When the DM-RS is transmitted in units of 1 PRB pair by applying the same precoder, correlation between channels estimated using the DM-RS within one PRB pair is obtained and a channel estimator may improve channel estimation accuracy using such correlation.

Similarly, when the DM-RS is transmitted in units of bundled PRBs by applying the same precoder, correlation between channels estimated using the DM-RS within the bundled PRBs is obtained and the channel estimator may improve channel estimation accuracy using such correlation. As compared to the units of one PRB pair, in units of bundled PRBs, since more channel samples having correlation exist, channel estimation accuracy is further improved.

In TM x, the concept of PRB bundling should be corrected as shown in Table 8 below such that PRB bundling is applicable even when PMI reporting is off. That is, the UE assumes PRB bundling if all processes configured therefor are PMI/RI reporting ON or PMI reporting OFF in TM x. For example, when process 1 in which PMI/RI reporting is ON and process 2 in which PMI reporting is OFF are configured for the UE, the UE assumes PRB bundling. The BS receives the fed-back CL CSI and the LD-CDD CSI via process 1 and process 2, dynamically determines which transmission scheme is used, and notifies the UE of the selected transmission scheme via DCI. Alternatively, when the BS does not notify the UE of this information, the UE may blind-detect the transmission scheme.

TABLE 8

A UE configured for transmission mode 9 for a given serving cell c
may assume that precoding granularity is multiple resource blocks in the
frequency domain when PMI/RI reporting is configured.
For a given serving cell c, if a UE is configured for transmission mode 10
    if PMI/RI reporting is configured for all configured
    CSI processes for the serving cell
    c, the UE may assume that precoding granularity
    is multiple resource blocks in the
    frequency domain,
      otherwise, the UE shall assume the precoding
      granularity is one resource block in the
      frequency domain.
For a given serving cell c, if a UE is configured for transmission mode x
    if PMI/RI reporting is configured or PMI reporting
    is off for all configured CSI
    processes for the serving cell c, the UE may assume
    that precoding granularity is
    multiple resource blocks in the frequency domain,
      otherwise, the UE shall assume the precoding granularity is
    one resource block in the frequency domain Like 00, 01, 10 and 11 respectively defined as PM/RI reporting ON, PMI/RI reporting OFF, PMI reporting OFF and PMI reporting ON in additional signaling having a size of 2 bits, although signaling indicating PMI reporting ON and PMI reporting OFF may be defined, the BS may notify the UE of PMI reporting ON/OFF depending on whether PMI reporting is configured. For example, when PMI reporting is configured, PMI reporting is interpreted as ON and, when PMI reporting is not configured, PMI reporting is interpreted as OFF.

The UE does not expect that the BS simultaneously configures PMI reporting and PMI/RI reporting and ignores PMI reporting and regards PMI/RI reporting as being configured when PMI reporting and PMI/RI reporting are simultaneously configured. Alternatively, when PMI reporting and PMI/RI reporting are simultaneously configured, PMI/RI reporting may be ignored and PMI reporting may be regarded as being configured.

PRB bundling is assumed as shown in Table 9 below when the BS notifies the UE of PMI reporting ON/OFF depending on whether PMI reporting is configured.

TABLE 9

A UE configured for transmission mode 9 for a given serving cell c
may assume that precoding granularity is multiple resource blocks in the
frequency domain when PMI/RI reporting is configured.
For a given serving cell c, if a UE is configured for transmission mode 10
    if PMI/RI reporting is configured for all configured
    CSI processes for the serving cell
    c, the UE may assume that precoding granularity
    is multiple resource blocks in the
    frequency domain,
      otherwise, the UE shall assume the precoding
      granularity is one resource block in the
      frequency domain.
For a given serving cell c, if a UE is configured for transmission mode x
    if PMI/RI reporting is configured or PMI reporting
    is not configured for all configured
    CSI processes for the serving cell c, the UE may
    assume that precoding granularity is
    multiple resource blocks in the frequency domain,
      otherwise, the UE shall assume the precoding
granularity is one resource block in the frequency domain Instead of PMI reporting ON/OFF signaling, RI reporting OFF/ON signaling may be introduced. In this case, RI reporting ON has the same meaning as PMI reporting OFF and RI reporting OFF has the same meaning as PMI reporting ON.

If RI reporting ON/OFF is defined instead of PMI reporting ON/OFF, Tables 8 and 9 above may be corrected as shown in Table 10 below.

TABLE 10

Figure 9:
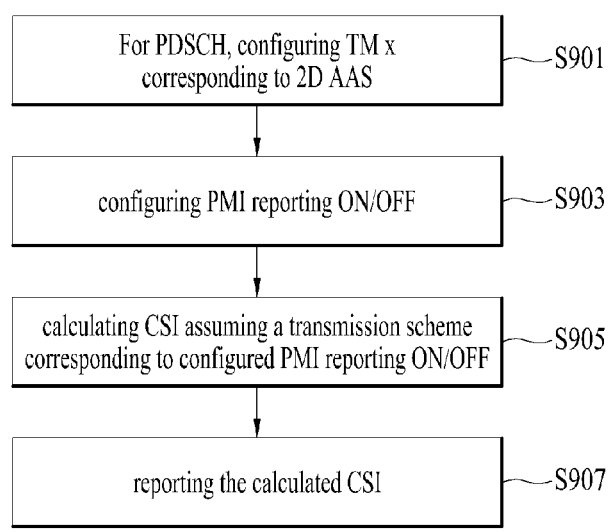
FIG. 9 is a flowchart illustrating a method of reporting a CSI to a BS at a UE according to an embodiment of the present invention.

A UE configured for transmission mode 9 for a given serving cell c may assume that precoding granularity is multiple resource blocks in the frequency domain when PMI/RI reporting is configured.
For a given serving cell c, if a UE is configured for transmission mode 10
   if PMI/RI reporting is configured for all configured
   CSI processes for the serving cell
   c, the UE may assume that precoding granularity
   is multiple resource blocks in the
   frequency domain,
   otherwise, the UE shall assume the precoding
   granularity is one resource block in the
   frequency domain.
For a given serving cell c, if a UE is configured for transmission mode x
   if PMI/RI reporting is configured or RI reporting
   is on (or RI reporting is configured)
   for all configured CSI processes for the serving
   cell c, the UE may assume that
   precoding granularity is multiple resource blocks in the
   frequency domain,
   otherwise, the UE shall assume the precoding granularity is one
resource block in the frequency domain That is, the relation of RI reporting OFF/ON may be summarized instead of PMI reporting ON/OFF signaling as follows:

PMI reporting ON=RI reporting OFF=PMI reporting is configured=RI reporting is not configured=without RI reporting PMI reporting OFF=RI reporting ON=PMI reporting is not configured=RI reporting is configured=without PMI reporting FIG. 9 is a flowchart illustrating a method of reporting a CSI to a BS at a UE according to an embodiment of the present invention.

Referring to FIG. 9, in step 901, the UE configures a 2D antenna array transmission mode of a downlink data channel via a higher layer. That is, for a PDSCH, TM x which is a transmission mode corresponding to a 2D AAS is configured. In addition, in step 903, the UE receives an indicator corresponding to one of transmission schemes of the downlink data channel via the higher layer. That is, one of PMI reporting ON/OFF or RI reporting OFF/ON is received.

Subsequently, in step 905, the UE calculates the channel state information on the assumption of the transmission scheme of the downlink data channel corresponding to the indicator. In step 907, the UE reports the calculated channel state information to the BS.

Here, the transmission schemes of the downlink data channel applied to TM x may include a DM-RS based LD-CDD transmission scheme and a closed loop multiplexing transmission scheme in the 2D antenna array transmission mode.

In particular, when the indicator indicates PMI reporting OFF or RI reporting ON, the transmission scheme of the downlink data channel corresponding to the indicator is preferably the DM-RS based LD CDD transmission scheme. Further, when the indicator indicates PMI reporting OFF or RI reporting ON, the rank indicator included in the channel state information may be fixed to 1 or a predetermined value.

According to the embodiments of the present invention, it is possible to efficiently report channel state information in order to apply a large delay (LD)-cyclic delay diversity (CDD) scheme corresponding to three-dimensional (3D) multiple input multiple output (MIMO) in a wireless communication system.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Although an example of applying, to a 3GPP LTE system, a method and apparatus for feeding back channel quality information in order to apply a large delay (LD)-cyclic delay diversity (CDD) scheme corresponding to three-dimensional (3D) multiple input multiple output (MIMO) in a wireless communication system is described, the present invention is applicable to various wireless communication systems in addition to the 3GPP LTE system.

What is claimed is:

1. A method of reporting channel state information to a base station at a user equipment (UE) in a wireless communication system, the method comprising:
    configuring a two-dimensional (2D) antenna array transmission mode of a downlink data channel via a higher layer;
    receiving an indicator corresponding to one of transmission schemes of the downlink data channel via the higher layer;
    calculating the channel state information on the assumption of one transmission scheme of the downlink data channel corresponding to the indicator; and
    reporting the calculated channel state information to the base station,
    wherein the transmission schemes of the downlink data channel include a demodulation-reference signal (DM-RS) based large delay (LD) cyclic delay diversity (CDD) transmission scheme and a closed loop multiplexing transmission scheme in the 2D antenna array transmission mode,
    wherein the indicator indicates whether a precoding matrix index is reported, and
    wherein, when the indicator indicates that the precoding matrix index is not reported, the transmission scheme of the downlink data channel corresponding to the indicator is the DM-RS based LD CDD transmission scheme.

2. The method according to claim 1, wherein, when the indicator indicates that the precoding matrix index is not reported, a rank indicator included in the channel state information is fixed to 1 or a predetermined value.

3. A user equipment (UE) in a wireless communication system comprising:
    a transceiver configured to transmit and receive a signal to and from a base station via a two-dimensional antenna array; and
    a processor configured to process the signal,
    wherein the processor controls the transceiver to configure a two-dimensional (2D) antenna array transmission mode of a downlink data channel via a higher layer, to receive an indicator corresponding to one of transmission schemes of the downlink data channel via the higher layer, to calculate the channel state information on the assumption of one transmission scheme of the downlink data channel corresponding to the indicator and to report the calculated channel state information to the base station, and
    wherein the transmission schemes of the downlink data channel include a demodulation-reference signal (DM-RS) based large delay (LD) cyclic delay diversity (CDD) transmission scheme and a closed loop multiplexing transmission scheme in the 2D antenna array transmission mode,
    wherein the indicator indicates whether a precoding matrix index is reported, and
    wherein, when the indicator indicates that the precoding matrix index is not reported, the transmission scheme of the downlink data channel corresponding to the indicator is the DM-RS based LD CDD transmission scheme.

4. The UE according to claim 3, wherein, when the indicator indicates that the precoding matrix index is not reported, a rank indicator included in the channel state information is fixed to 1 or a predetermined value.

* * * * *